(No Model.)
G. R. THACKER.
PIPE COUPLING.
No. 579,284.          Patented Mar. 23, 1897.
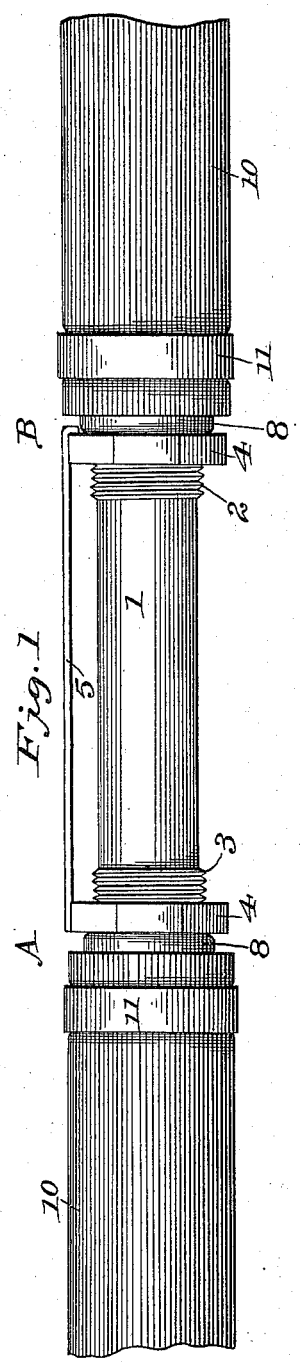
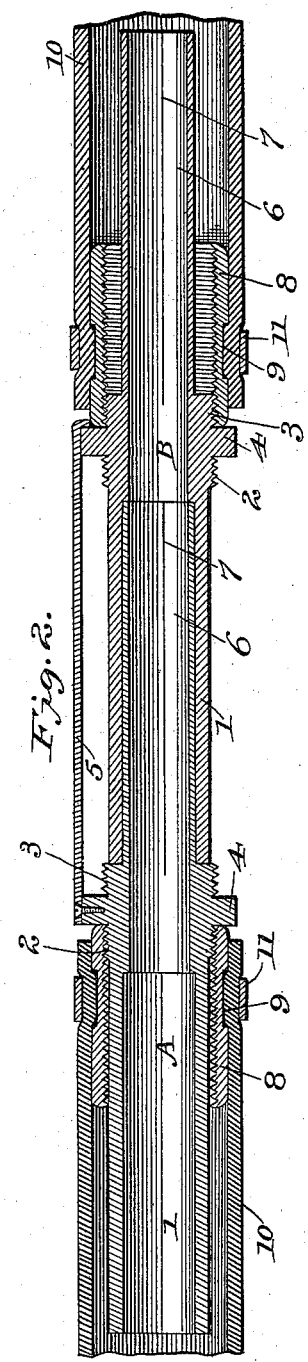
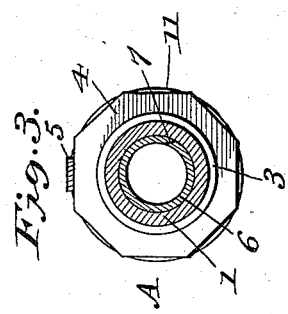
Witnesses
E. G. McKee
K. A. Nau
Inventor,
George R. Thacker,
by John Wedderburn
Attorney

United States Patent Office.

GEORGE R. THACKER, OF PHILLIPSBURG, KANSAS.

PIPE-COUPLING.

SPECIFICATION forming part of Letters Patent No. 579,284, dated March 23, 1897.

Application filed June 10, 1896. Serial No. 594,992. (No model.)

*To all whom it may concern:*

Be it known that I, GEORGE R. THACKER, a citizen of the United States, residing at Phillipsburg, in the county of Phillips and State of Kansas, have invented certain new and useful Improvements in Pipe-Couplings; and I do hereby declare the following to be a full, clear, and exact description of the invention, such as will enable others skilled in the art to which it appertains to make and use the same.

My invention relates to pipe-couplings, and more particularly to those pipe-couplings especially adapted for use in connection with air and steam pipes used on railway-trains.

My object is to provide an improved and simple detachable and interchangeable pipe-coupling of the class described which will be adapted for quick and easy manipulation and for automatic uncoupling.

Having this object in view, the invention consists of certain novel features and combinations appearing more in detail hereinafter.

In the accompanying drawings, Figure 1 is a side elevation; Fig. 2, a longitudinal section, and Fig. 3 a cross-section taken through the center of the coupling.

My improved pipe-coupling consists of duplicate coupling members A and B, and hence a description of one will suffice.

The numeral 1 designates a cylindrical socket which is provided with two sections of raised screw-threads 2 and 3. A nut 4 is formed integral with the socket and is located between the screw-threaded sections thereof. A spring-hook 5 is connected to the nut and has its hooked end adapted to engage with the nut on the other coupling member when the coupling is connected, so that said nuts will be locked against movement. An expansion-tube 6, provided with a longitudinal oblique slit 7, has one end fitted in and connected to the screw-threaded end of the socket, said tube being of the same diameter throughout its length. I provide an internally-screw-threaded sleeve 8, which is adapted to engage with either screw-threaded section and is provided with a peripheral groove 9. This sleeve is permanently secured within one of the hose-sections 10, to be coupled by an outer band 11.

The coupling is coupled by forcing the outer expansion-tube of one coupling member into the outer socket of the other member and engaging the hooks and nuts.

Frictional contact will then keep the coupling connected, and this will be enhanced when steam or air pressure is in the pipes, for the expansion-tube will then be still further expanded. After the steam or air pressure is removed the separation of the cars will automatically disconnect the coupling, thereby rendering my device particularly advantageous, as time and labor are saved. However, it often happens that the cars are so moved that two sockets or two expansion-tubes are outermost. When this occurs, a wrench should be applied to the nut on one of the coupling members, and the socket and expansion-tube unscrewed from the sleeve in the end of the hose. The part unscrewed is then reversed and replaced, whereupon the members can be coupled, as before described.

It will be observed that besides automatic uncoupling my invention possesses the advantage that no packing of any kind is needed, as the pressure of steam or air expands the expansion-tube and automatically packs the coupling.

A further advantage resides in the fact that the relative insertion and removal of the expansion-tubes and sockets tends to keep the coupling free from foreign matter, so that the passage of steam or air is in nowise resisted.

It is to be understood that I do not limit myself to the precise construction herein shown and described, but consider myself entitled to all such variations as come within the spirit and scope of the invention.

Having thus described the invention, what is claimed as new is—

1. In a pipe-coupling, the combination of duplicate coupling members each provided with a socket and an expansion-tube adapted to fit the socket of the other coupling member, substantially as described.

2. In a pipe-coupling, the combination with respective screw-threaded sleeves, of duplicate coupling members each provided with a socket having external screw-threads adapted to engage with the sleeve, and an expansion-tube adapted to fit the socket of the other coupling member, substantially as described.

3. In a pipe-coupling, the combination with respective screw-threaded sleeves, of duplicate coupling members each having a socket provided with an integral nut and respective screw-threaded sections thereon on opposite sides of said nut, said screw-threaded sections being adapted to engage with the sleeve, and an expansion-tube adapted to fit the socket of the other coupling member, substantially as described.

In testimony whereof I have signed this specification in the presence of two subscribing witnesses.

GEORGE R. THACKER.

Witnesses:
C. A. PORTER,
I. D. THORNTON.